United States Patent [19]
Ekstrom et al.

[11] Patent Number: 5,968,126
[45] Date of Patent: *Oct. 19, 1999

[54] USER-BASED BINDING OF NETWORK STATIONS TO BROADCAST DOMAINS

[75] Inventors: Joseph J. Ekstrom; J. Bernard Gille, both of Lindon, Utah

[73] Assignee: SwitchSoft Systems, Inc., Redwood City, Calif.

[ * ] Notice: This patent is subject to a terminal disclaimer.

[21] Appl. No.: 08/832,011

[22] Filed: Apr. 2, 1997

[51] Int. Cl.$^6$ .................................................. G06F 15/177
[52] U.S. Cl. .......................................... 709/225; 370/409
[58] Field of Search ........................ 379/901; 395/200.68, 395/200.55; 370/397, 398, 409, 399; 709/238, 225

[56] References Cited

U.S. PATENT DOCUMENTS

| | | | |
|---|---|---|---|
| 4,922,486 | 5/1990 | Lidinsky et al. | 370/427 |
| 5,394,402 | 2/1995 | Ross | 370/402 |
| 5,572,528 | 11/1996 | Shuen | 370/402 |
| 5,684,800 | 11/1997 | Dobbins et al. | 370/401 |
| 5,761,201 | 6/1998 | Vaudreuil | 370/392 |
| 5,812,533 | 9/1998 | Cox et al. | 370/259 |

OTHER PUBLICATIONS

D.R. Cheriton et al., "Host Groups: A Multicast Extension for Datagram Internetworks", Proceedings of Ninth Data Communcation Symposium (ACM), Sep. 10–13, 1985, pp. 172–179.

"Security Feature for Local Area Network Switches" IBM Technical Disclosure Bulletin, vol. 39, No. 9, Sep. 1996, pp. 137–143.

Hamilton, Dave, et al., *Programming Window NT 4*, (Sams Publishing, Indianapolis, IN, 1996).

Bierer, Doug, et al., *NetWare 4 for Professionals*, (New Riders Publishing, Indianapolis, IN, 1993).

Sant' Angelo, Rick et al., *Windows NY Server Survival Guide*, (Sams Publishing, Indianapolis, IN, 1996).

Martin McNealis, "New Cisco IOS VLAN Services Make 'Virtual' a Reality", Cisco Systems Inc. Jun. 6, 1995. (5 pages).

"Configuring Ethernet and Fast Ethernet Software", Cisco Systems, Inc. website (http://www.cisco.co.../sw_confg/80857.htm), 1996. (14 pages).

"Product Overview (Catalyst 5000)", Cisco Systems, Inc. website (http://www.cisco.co.../onfg/80847.htm#HDR1), 1996. (18 pages).

"Configuring the Software (Catalyst 5000)", Cisco Systems, Inc. website, (http://www.cisco.co.../sw_confg/80845.htm), 1996. (19 pages).

"Supported Protocols and MIBs (Catalyst 1200)", Cisco Systems, Inc. website, (http://www.cisco.co...at1200/ug/61642.htm), 1996. (3 pages).

"Downloading Files", Cisco Systems, Inc. website, (http://www.cisco.co.../sw_confg/80843.htm), 1996. (14 pages).

"Creating a Configuration File", Cisco Systems, Inc. website, (http://www.cisco.co.../sw_confg/80858.htm), 1996. (2 pages).

"Command Line Interfaces", Cisco Systems, Inc. website, (http://www.cisco.co.../sw_confg/80839.htm), 1996. (25 pages).

"Command References", Cisco Sytems, Inc. website, (http://cisco.co.../sw_confg/80842.htm), 1996. (210 pages).

*Primary Examiner*—Zarni Maung
*Assistant Examiner*—Kenneth R. Coulter
*Attorney, Agent, or Firm*—Skjerven Morrill MacPherson Franklin & Friel LLP; Michael Shenker

[57] ABSTRACT

A broadcast or multicast message from a network station is forwarded only to stations in the same virtual broadcast domain (VBD) as the sending station. In some embodiments, a VBD is virtual network (VLAN) or a workgroup (a group of stations, possibly within a VLAN). A membership of a network station in a VBD is determined based on the user who logged on to the station. When the station is first powered up, it is bound to a "default" VBD. When a user logs on, the VBD(s) assigned to the user are determined, and the user's station is switched to the VBD(s). When the user logs off, the user's station is returned to the default VBD.

54 Claims, 1 Drawing Sheet

USER-BASED BINDING OF NETWORK STATIONS TO BROADCAST DOMAINS

BACKGROUND OF THE INVENTION

The present invention relates to networks, and more particularly to binding network stations to broadcast domains.

A broadcast domain is a smaller network within a large network such that any broadcast or multicast message originating in the smaller network is forwarded only within the smaller network. Broadcast domains improve the use of network resources and the network security because broadcast domains limit the number of stations that receive broadcast and multicast messages.

Virtual networking is a way to define the broadcast domains without necessarily changing the physical connections between network stations. Virtual networks (also called virtual LANs, or VLANs) are smaller networks that can be defined by issuing commands to the large network. Based on these commands, the network will forward broadcast and multicast messages only to stations that are members of the same VLAN as the originating station. Since defining a VLAN does not involve changing the physical connections between the stations, defining and redefining VLANs is facilitated.

It is desirable to provide convenient techniques for defining broadcast domains.

SUMMARY

The present invention provides convenient techniques to define virtual broadcast domains (VBDs). VBDs are broadcast domains that can be defined without necessarily changing the physical connections in the network. VLANs are examples of VBDs. Other examples include workgroups such as can be defined using switches available from UB Networks, Inc. of Santa Clara, Calif.

In some embodiments of the present invention, a network station's membership in a VBD is defined based on an identification of a user using the station. Thus, in some embodiments, the station membership is based on a user name entered at the user logon. In some such embodiments, when network stations are powered up, they are placed in a "default" or "logon" VBD. When a user logs on, the network determines the VBD or VBDs assigned to the user, and the network station to which the user has logged on is switched to the assigned VBD(s). When the user logs off, the network station is returned to the default VBD. (Certain events such as power failure or the user turning off the station without logging off, may prevent the station from being returned to the default VBD. However, when a user subsequently logs on, the station is switched to VBD(s) assigned to the user.)

Assigning VBDs based on the user allows users to log on to a larger number of stations than in some networks in which every station is permanently assigned to a predefined VBD.

Other features and embodiments of the invention are described below. The invention is defined by the appended claims.

DESCRIPTION OF PREFERRED EMBODIMENTS

Figure 1:
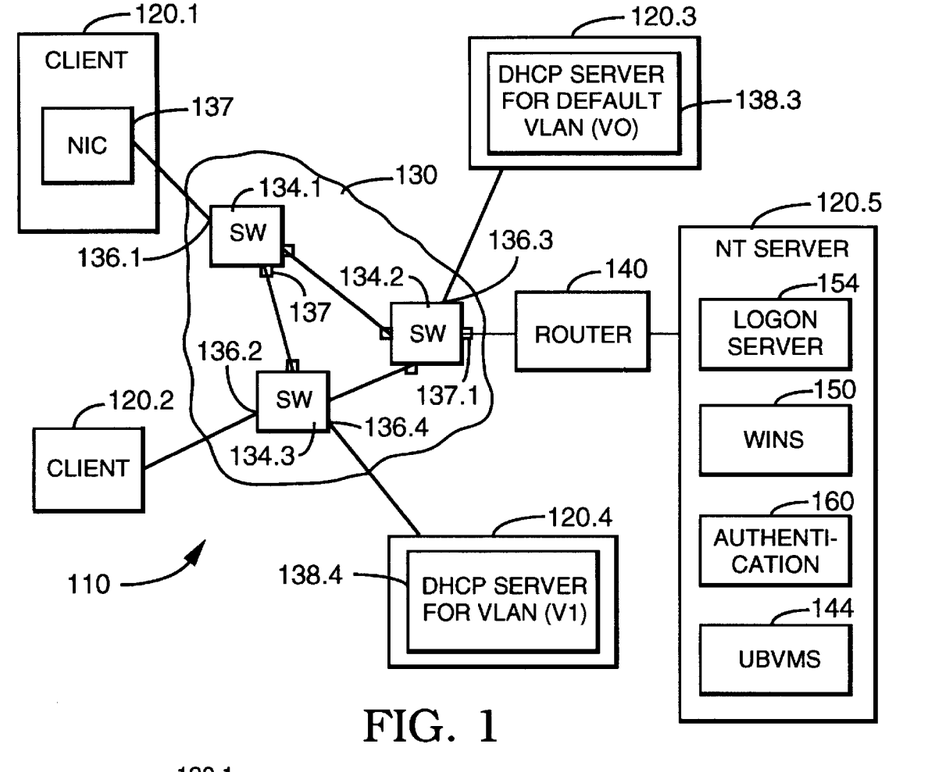
FIGS. 1 and 2 are block diagrams of networks according to the present invention.

FIG. 1 is a block diagram of a network 110 in which a network station can be bound to a virtual broadcast domain based on the user name. In FIG. 1, network stations 120.1 through 120.4 are each connected to a separate port (136.1 through 136.4 respectively) of a switch 134 (one of switches 134.1, 134.2, 134.3) of switch fabric 130. For example, station 120.1 is connected to port 136.1 of switch 134.1.

Switch fabric 130 forwards every message to only those stations 120 that are members of the same virtual broadcast domain (VBD) as the station 120 originating the message. If a message destination is outside the VBD of the station originating the message, the message is discarded by switch fabric 130.

In some embodiments, every VBD is a VLAN. In other embodiments, a VLAN broadcast domain includes smaller VBDs such as workgroups. Workgroups within a VLAN can be defined using switches available from UB Networks, Inc. of Santa Clara, Calif.

In network 110, VBDs are defined by configuring the ports 136 of switch fabric 130. A station 120 is in a VBD if the port 136 to which the station is connected is in the VBD.

Each of stations 120.1, 120.2 is bound to a VBD based on the user who logged on to the station. Binding the station based on the user expands the number of stations to which the users can be allowed to log on without compromising the network security. This is because when the user logs on to station 120.1 or 120.2, the user is not given access to VBDs which the user is not authorized to access.

We will now describe some embodiments in which:

(1) Every VBD is a VLAN. In some embodiments, VLANs can overlap, i.e. a port 136 can be in more than one VLAN. In other embodiments, VLANs do not overlap.

(2) The operating system (OS) running on stations 120 is of type Windows NT™ described, for example, in the following publications incorporated herein by reference: M. Williams and D. Hamilton, "Programming Windows NT™ 4 Unleashed" (1996); R. Sant'Angelo, N. Chagtai, "Windows® NT Server Survival Guide" (1996).

In some embodiments, switches 134 are of type Catalyst 5000 available from Cisco Systems, Inc. of San Jose, Calif. Using VLANs with Cisco switches is described, for example, in M. McNealis, "New Cisco IOS VLAN Services Make 'Virtual' a Reality" (Cisco Systems, Inc., 1996) available on World Wide Web at http:\\www.ij.com\warp\public\705\5.html and incorporated herein by reference.

Every station 120 includes a network interface card (NIC) 137 (shown only for station 120.1 for simplicity). Every station 120.1–120.4 is connected to a port 136 through its NIC 137. Every NIC 137, and hence every station 120, is identified by a MAC (media access controller) address which is the physical address of NIC 137. In some embodiments, a single station 120 may have multiple NICs, and hence multiple MAC addresses. For now, we will assume that each station 120.1 through 120.4 has a single NIC.

A MAC address is used as a data link layer address in network 110. The data link layer (also called "layer 2") of the OSI model, and other OSI layers, are described, for example, in Bierer et al., "NetWare® 4 For Professionals" (1993), pages 3–37 incorporated herein by reference. Switch fabric 130 forwards packets based on MAC addresses.

Table 1 below illustrates some fields of a data link layer message in network 110. The fields include a source MAC address (item 2 in Table 1) and a destination MAC address (item 3). The destination MAC address can be a unicast, broadcast or multicast address.

The next layer up from layer 2 is layer 3 ("network layer"). In network 110, layer 3 uses the IP protocol stack described in "NetWare™ 4 For Professionals", pages 3–37 cited above. A network layer message (also called an IP packet; see item 4 in Table 1) is encapsulated into a data link layer message. (Table 1 does not show all the fields of an IP packet or a data link layer message.)

TABLE 1

| Data Link Layer Message |
|---|
| 1. VLAN ID tag (on trunk ports only) |
| 2. Source MAC address |
| 3. Destination MAC address |
| 4. IP packet |
|     4-1. Source IP address |
|     4-2. Destination IP address |
|     4-3. Data |

At the network layer, each NIC 137 is identified by a unique IP address. Source and destination IP addresses are shown as items 4-1 and 4-2 in Table 1. IP addresses are logical addresses—the same IP address can be assigned to different stations 120 at different times. IP addresses are assigned by DHCP servers 138.3, 138.4 (FIG. 1). DHCP (Dynamic Host Control Protocol) servers are described, for example, in R. Sant'Angelo and N. Chagtai, "Windows® NT Server Survival Guide" (1996), pages 604–608 incorporated herein by reference.

At the network layer, each VLAN is defined by a range of IP addresses which can be assigned to stations 120 that belong to the VLAN. This range of the IP addresses is called an IP subnet. The range is defined by an IP address and a subnet mask showing which bits in the address are the same for every station in the VLAN. This is illustrated by the following example. Suppose an IP subnet is defined by an IP address of 128.203.45.0 and a subnet mask of 255.255.255.0 (a 32-bit number in which the first 24 bits are 1 and the last eight bits are 0; each of the four components of an IP address or a subnet mask represents 8 bits). This means that all the IP addresses in the subnet have the first 24 bits of 128.203.45. The last eight bits form a workstation address within the subnet.

Now we will describe an embodiment in which different VLANs do not overlap, that is, each port 136 belongs to a single VLAN. Thus, the network traffic appearing on any given port 136 belongs to a single VLAN.

Switches 134 include also trunk ports 137 which can carry traffic from multiple VLANs. Trunk ports 137 are used to connect the switches to each other and to routers. Router 140 is connected to a trunk port 137.1 of switch 134.2.

Windows NT server station 120.5 is connected to router 140.

Each data link layer message transmitted or received on a trunk port 137 includes a VLAN ID tag (item 1 in Table 1 above). This tag identifies the VLAN in which the message will be forwarded. In messages transmitted on ports 136, the VLAN ID tags are omitted.

Because router 140 is connected to a trunk port, router 140 can communicate with many VLANs, possibly all VLANs defined for switch fabric 130. The VLANs with which router 140 can communicate are defined by configuring the trunk port 137.1 via commands to switch 134.2. Router 140 may choose to allow different VLANs to communicate. Alternatively, a firewall in router 140 may disallow communication between different VLANs.

Messages transmitted between router 140 and NT server 120.5 include a VLAN ID tag.

A unicast (i.e. non-broadcast, non-multicast) message from any one of stations 120.1 through 120.4 to station 120.5 includes the destination MAC address of router 140 (item 3 in Table 1) and the IP address of station 120.5. A unicast message from station 120.5 to any station 120.1 through 120.4 includes the destination MAC address of the router 140 and the destination IP address of the destination station 120.1 through 120.4. Router 140 replaces the destination MAC address with the MAC address of the destination station, and the source MAC address with the MAC address of router 140, as known in the art.

In some embodiments, router 140 is omitted, and NT server 120.5 is connected directly to trunk port 137.1. In some such embodiments, NT server 120.5 has one NIC for each VLAN on which the server 120.5 will communicate. In other embodiments, NT server 120.5 has a single NIC configured by software as multiple virtual NICs. The software is BusBIOS™ VLAN Solutions available from Xpoint Technology, Inc. See "Installation Guide for Xpoint's Bus-BIOS™ VLAN Solutions with ServerLink ISL Adapter" (Xpoint Technologies, Inc. 1996) incorporated herein by reference.

In some embodiments, network 110 is part of a larger network that includes other stations and in particular other switches and routers and other internetwork devices.

Stations 120.1, 120.2, which are bound to VLANs based on the user name, will be called herein "client" stations because these stations are clients of UBVMS server 144. UBVMS stands for "user-based VLAN management services." UBVMS server 144 serves requests to bind clients to proper VLANs.

In FIG. 1, UBVMS server 144 runs on NT server station 120.5. NT server station 120.5 also runs WINS server 150 (Windows NT™ name server), LOGON server 154, and authentication server 160. In some embodiments, UBVMS server 144 runs on a different network station or stations accessible from every VLAN in network 110. Clients 120 contact UBVMS server 144 using the server's named pipe. The pipe name (e.g., "\\WorkstationName\UBVMS") is present in the clients' logon scripts. Logon script execution (program CLNS in Appendix A) is described below.

In some embodiments different instances of the UBVMS server run on different server stations. Each UBVMS server instance is reachable from one or more VLANs. A client 120 gets the pipe name of the respective UBVMS server instance from a logon script as described above. Alternatively, when a client needs to reach a UBVMS server, the client sends a broadcast message to the UBVMS servers to determine the nearest UBVMS server, and then uses the nearest server.

Server stations 120.3, 120.4 are permanently bound to certain VLANs irrespectively of the user who logs on to them. Station 120.3 is bound to a VLAN V0. Station 120.4 is bound to another VLAN V1. Stations 120.3, 120.4 run respective DHCP server applications 138.3, 138.4. DHCP servers 138.3, 138.4 lease IP addresses to stations that are members of respective VLANs V0, V1.

When switch fabric 130 is powered up, switch fabric 130 binds to the "default" VLAN V0 all ports 136 connected to client stations 120. Thus, ports 136.1 and 136.2 are bound to VLAN V0. Port 136.3 connected to DHCP server station 120.3 is also bound to VLAN V0. Port 136.4 is bound to VLAN V1.

Appendices A and B illustrate pseudocode for processes running on client stations 120.1, 120.2 and NT server 120.5. These processes will be described on the example of client 120.

When client 120.1 is powered up, the client executes a Windows NT power up program CPW illustrated at the beginning of Appendix A. The power up program can be invoked, for example, from file c:\autoexec.bat stored on client 120.1. This program sends a request to a DHCP server to get an IP address. This request uses the BOOTP protocol known in the art. The BOOTP protocol does not use IP addresses. Switch fabric 130 broadcasts the BOOTP request only to the VLAN containing the port 136.1. The respective DHCP server 138 (e.g., server 138.3 for VLAN V0) selects an available IP address in the IP subnet of the VLAN and sends the address to client 120.1. Then the client sends a request to WINS server 150 to register the IP address and the client's workstation name. In the embodiment of FIG. 1, WINS server 150 runs on NT server station 120.5. In other embodiments, the WINS server runs on a separate network station accessible from every VLAN of network 110.

When a user logs on at client station 120.1, client 120.1 executes a logon program CLN shown in Appendix A. In some embodiments, program CLN is executed on any logon, including local and domain logons. Local logons are intercepted, and reported to server 120.5, using a Graphical Identification and Authentication (GINA) DLL (Dynamic Link Library). In such embodiments, GINA.DLL performs the functions of programs CLN, CLNS, CLNA (Appendix A). Further, step CLNA2 (starting the background process as described below) is not needed.

In other embodiments, to avoid installing the GINA DLL on the client stations, the local logons do not cause the client to be switched to a different VLAN, and program CLN is executed only for domain logons. Below, we assume that the logon is a domain logon unless stated otherwise.

Logon program CLN is a conventional program in some embodiments. At step CLN1 of this program, the client sends a logon request to LOGON server 154. The logon request contains the user name and password and the workstation name of client 120.1. LOGON server 154 serves the request by executing the program SCLN (Appendix B) described below. Program SCLN authenticates the logon. (If the logon is local, the SCLN functions are performed by client 120.1.) At step CLN2, client 120.1 executes the logon script.

Program SCLN (Appendix B) performs the following actions. At step SCLN1, LOGON server 154 sends an authentication request with the user name and password to authentication server 160. In FIG. 1, authentication server 160 runs on NT server 120.5. In some embodiments, authentication server 160 runs on a different network station accessible to LOGON server 154.

If the response from server 160 shows authentication failure, LOGON server 154 responds to client 120.1 with an error message and terminates the logon request processing.

At step SCLN2, LOGON server 154 resolves the user name to the security ID (SID). At step SCLN3, LOGON server 154 sends the SID to client 120.1. Client 120.1 will use the SID to access the logon script at step CLN2 (Appendix A). The association between user names and SIDs is stored in the Registry. The Registry is a database described, for example, in "Windows® NT Server Survival Guide", cited above, pages 405–449 incorporated herein by reference.

The logon script CLNS (Appendix A) causes the client to perform the following actions. At step CLNS1, client 120.1 loads a logon application CLNA from server 120.5 and executes the application. This application will cause the client to be switched to VLAN(s) assigned to the user, as described below. Then at step CLNS2, client 120.1 performs other suitable logon actions as known in the art.

After the logon script is executed, the Windows NT operating system (OS) on client 120.1 reads the user profile and restores the workstation connections as known in the art. In some embodiments, the user profiles are set so that they require the logon script to run to completion before the profile connections are attempted.

Client logon application CLNA (Appendix A) performs the following actions. The application gets the user logon name which is stored on client 120.1. At step CLNA1, a loop is executed which includes steps CLNA1-1 through CLNA1-5. At step CLNA1-1, client 120.1 uses the TCP protocol to send a request to UBVMS server 144 to switch the client to VLAN or VLANs assigned to the user. The request contains the user name and the MAC and IP addresses of station 120.1. In some embodiments, the VLAN (s) to which the station will be switched are determined based on a combination of the user name with some other information, for example, the domain name, the MAC address, and/or the time of day. In some embodiments, the domain name, and possibly other information needed to determine the VLAN(s), are included in the request. In some embodiments, the request contains the identity of the switch and port through which the client's NIC is attached to switch fabric 130.

UBVMS server 144 serves the request by executing the program UBA (Appendix B). UBVMS server 144 may optionally log the request in the system log (step UBA0).

The next step UBAL includes steps UBA1-1, UBA1-2. At step UBA1-1, UBVMS server 144 resolves the user name to the user assigned VLAN or VLANs (e.g. to VLAN V1). In some embodiments, the assigned VLAN or VLANs are determined from a combination of the user name with some other information, for example, the domain name, the client MAC address, or the time of day. In particular, the domain name is used if UBVMS server 144 serves multiple domains and the same user name can exist in multiple domains. The UBVMS server determines the assigned VLAN(s) from the user name and such other information.

In some embodiments, the association between the user names, and possibly other information, on the one hand and the assigned VLAN(s) on the other hand is stored in the Registry.

At step UBA1-2, UBVMS server 144 resolves the client MAC address to the switch and port through which the client is connected to switch fabric 130 (i.e. switch 134.1/port 136.1). (In some embodiments, the station's membership in VLANs is determined by means of the station's MAC address rather than the port 136 to which the station is connected. In such embodiments, resolving the MAC address to the switch/port is omitted.)

At step UBA2, UBVMS server 144 checks if the client's IP address is in the IP subnet(s) of the assigned VLAN(s). Then UBVMS server 144 sends a response to client 120.1. If the client's IP address is in the assigned VLAN(s), the response indicates that the client will not be switched to another VLAN. Otherwise, the response indicates that the client will be switched. In addition, the response includes the IP subnet (IP address defining the subnet and the IP subnet mask) of each assigned VLAN. If the client will not be switched, the remaining steps UBA3 and UBA4 are omitted.

If the response indicates that the client is not to be switched, the client exits the loop of steps CLNA1. Otherwise, at step CLNA1-2, the client sends a request to a DHCP server to release the DHCP lease. Since the client is still on the default VLAN V0, this request is served by DHCP server 138.3. Meanwhile, UBVMS server 144 waits for the client to release the DHCP lease (step UBA3). In some embodiments, at step UBA3 the UBVMS server 144 simply waits for a predetermined length of time. UBVMS server 144 assumes that by the end of this period of time the DHCP lease has been released. In other embodiments, at step UBA3 server 144 monitors the client's DHCP lease by: (1) polling the DHCP server 138.3 to inquire whether the client 120.1 has released the DHCP lease; or (2) requesting the DHCP server 138.3 to notify the UBVMS server when client 120.1 releases the DHCP lease. In some embodiments, the UBVMS server and all the DHCP servers are parts of the same program which informs the UBVMS server when the DHCP lease has been released.

Then at step UBA4, UBVMS server 144 issues a command to the switch fabric 130 to place the port 136.1 into the assigned VLAN(s). In some embodiments, this command specifies the switch/port determined at step UBA1-2. In other embodiments, this command does not specify the switch/port. Instead, the command specified the client MAC address. In some such embodiments, resolving the MAC address to the switch/port is omitted at step UBA1-2. The MAC address is resolved by switch fabric 130 in response to the command. In other embodiments, the switch/port ID is supplied by the client in the request to the UBVMS server. If switches 134 are Catalyst 5000 switches mentioned above, the client learns the switch/port ID by listening for Cisco Discovery Protocol (CDP) notifications.

After releasing the DHCP lease (step CLNA1-2), the client waits for a predetermined length of time to allow the UBVMS server 144 to switch the client 120.1 to the assigned VLAN or VLANs (step CLNA1-3). After the predetermined length of time, client 120.1 assumes that it has been switched. At step CLNA1-4, client 120.1 requests a DHCP server for an IP lease. The request uses the BOOTP protocol. If the client has been switched to the assigned VLAN(s), switch fabric 130 forwards the request to DHCP server 138.4.

The OS on client 120.1 registers the new IP with the WINS server.

At step CLNA1-5, client 120.1 checks if the new IP address is in the assigned VLAN(s). The client performs this check by testing if the new IP is in the IP subnet(s) sent to the client by UBVMS server 144 at step UBA2. If the new IP is not in the assigned VLAN(s), the loop of steps CLNA1-1 through CLNA1-5 is repeated. In some embodiments, on each iteration of this loop CLNA1, the waiting period of step CLNA1-3 is increased. Hence, the client waits longer before assuming that the client has been switched to the assigned VLAN or VLANs.

In some embodiments, the loop of step CLNA1 is repeated at most of predetermined number of times (for example, three times). After that, if the client is still not in the assigned VLAN(s), program CLNA terminates. In some embodiments, before the termination, the program CLNA sends a logoff request to LOGON server 154.

If at step CLNA1-5 the client finds itself in the assigned VLAN or VLANs, the client starts a background process that waits for a logoff (step CLNA2). The background process will cause the client 120.1 to be switched back to the default VLAN when the user logs off. By the time the user logs off, the default VLAN may be redefined to a VLAN other than V0. Below we assume that the default VLAN will not be redefined. If the default VLAN is redefined the logoff processing by the background process is similar to that described below.

When the user logs off, the background process executes operations similar to those of client logon application CLNA (Appendix A), except that the assigned and default VLANs change places. In particular, the background process sends a request to the UBVMS server 144 to switch the client to the default VLAN V0 (step CLNA1-1). UBVMS server 144 performs actions similar to those shown in Appendix B for program UBA. However, in some embodiments, step UBA1-1 is omitted for the background process because UBVMS server 144 does not need to know what the assigned VLAN is—the server only needs to know the default VLAN which is the same VLAN for all clients. Some embodiments (suitable for large networks) have multiple default VLANs. The default VLAN for a given client is a function of the switch and port through which the client's NIC is connected to switch fabric 130. In such embodiments, at step UBA1-1 the UBVMS server resolves the client's switch/port ID to the default VLAN. Step UBA1-1 is performed after UBA1-2.

At step UBA2, the server checks whether the client's IP address is in the default VLAN, and sends a response accordingly. If the client is in the default VLAN, then steps UBA3, UBA4 are omitted. Otherwise, at step UBA3, UBVMS server 144 waits for the client to release the DHCP lease in the assigned VLAN or VLANs. At step UBA4, the client is switched to the default VLAN.

Step CLNA2 is omitted for the background process.

After the client is switched to the default VLAN, the background process terminates.

In some embodiments, the background process operation is synchronized as follows. When the user logs off, the client OS sends logoff notification to all applications running on the client, including the background process. The background process registers with the operating system to be the last process to receive logoff notifications. This is done to allow other applications to terminate before the background process causes the client to be switched to the default VLAN.

In some embodiments, when the background process receives the logoff notification, the background process responds asking the OS to cancel the logoff, and then starts a separate process that causes the client to be switched to the default VLAN. The logoff is cancelled because it is not possible to start a new process during the logoff. After the client is switched to the default VLAN, the background process itself initiates a logoff. This logoff also causes the operating system to send a logoff notification to the background process and other applications. The background process does not do any VLAN switching upon this logoff notification, but simply replies to the operating system that the logoff can proceed.

In other embodiments, whenever the background process receives the logoff message, the background process causes the client to be switched to the default VLAN without starting a new process, and then replies to the OS that the logoff can proceed.

In some embodiments, the client 120.1 may be switched to the default VLAN before a logoff. This may happen if the user turns off the workstation 120.1 without logging off. This may also happen if the user disconnects the workstation from switch 134.1. In either case, switch 134.1 will detect a carrier drop and sends a TRAP to a management application running on a network station. (TRAPs are part of SNMP (Simple Network Management Protocol)). The management application will notify UBVMS server 144. In response, UBVMS server 144 will switch the port on which the carrier drop was detected (port 136.1) to the default VLAN.

In some embodiments, UBVMS server 144 delays switching the port to the default VLAN while periodically trying to reestablish contact with client 120.1 using, for example, the well known "ping" protocol. Hence, if the user has not turned off the client station 120.1 but rather has disconnected the station (in order to move the station around the office for example), and if the user reconnects the station to port 136.1 while UBVMS server 144 still tries to reestablish connection with client 120.1, the user may continue operation without having to reboot the client station.

In some embodiments, the background processes running on the client stations check periodically that their respective stations are in the respective assigned VLANs. The check is made by a background process requesting UBVMS server 144 to tell the client what subnets are assigned to the client. If the client running the background process is in a wrong VLAN (subnet), the background process will not receive a response. More particularly, switch fabric 130 will append to the request the VLAN ID tag (Table 1) of the VLAN containing the port 136 on which the request was received by the switch fabric. The router 140 will discover that the source IP address in the request does not match the IP subnet corresponding to the VLAN ID tag, and the router will discard the request. If the background process does not receive a response, the background process will release the DHCP lease, renew the DHCP lease (thus receiving an IP address in the subnet of the VLAN containing the port 136 to which the client is attached), and the background process will re-issue the request to UBVMS server 144. If the response to this request shows that the client is not in a VLAN (subnet) assigned to the client's user, the background process will have the client switched to the default VLAN, or to the VLAN(s) assigned to the user. The switching operation is similar to that of programs CLNA, UBA.

The procedure described immediately above enhances the network security in a situation when another user connects another workstation to port 136.1 after the station 120.1 gets disconnected. More particularly, suppose a user U1 logged on to client station 120.1 and received access to VLAN V1. A user U2 logged on to client 120.2 and received access to a VLAN V2 but not to VLAN V1. Then user U1 left, and user U2 disconnected workstation 120.1 and connected station 120.2 to port 136.1. The background process on station 120.2 will discover that the station is not in the VLAN assigned to user U2 (that is, not in VLAN V2). When this happens, the background process of station 120.2 will request UBVMS server 144 to switch the port 136.1 to the default VLAN or to VLAN V2.

Some embodiments do not use the background process to switch clients to the default VLAN on a logoff. Switching to the default VLAN is performed similarly to the NetWare® embodiment shown in Appendix C. More particularly, UBVMS server 144 learns of logoffs by periodically reading the system log (similarly to step UBVMS1 in Appendix C). The logoff records in the system log include the names of workstations at which the logoffs occurred. NT server 120.5 also stores a list of names of workstations that are bound to VLANs based on the user name. (For FIG. 1, the list contains the names of stations 120.1, 120.2.) For each logoff record, UBVMS server 144 searches the list for the workstation name in the logoff record (step UBVMS2-1). If the logoff-workstation name is in the list, UBVMS server 144:

(1) resolves the workstation name to the client's MAC address. (This is done using: (a) the NBSTAT utility described in "Windows® NT Server Survival Guide," cited above, at page 914 incorporated herein by reference and (b) the gethostbyname WINSOCK call);

(2) resolves the MAC address to the client's switch/port as described above in connection with step UBA1-2; and (3) switches the client to the default VLAN similarly to step UBA4.

In such embodiments, the client retains the DHCP lease in the VLAN or VLANs assigned to the user who logged off. The lease is retained until the client tries to renew the lease, or until the client workstation is rebooted or reset.

In some embodiments that do not use the background process to switch clients to the default VLAN on a logoff, the background process is still started at step CLNA2 to check periodically that the workstation is in the assigned VLAN(s). The check is performed by sending a message to the UBVMS server. If the workstation is not in the assigned VLAN(s), the workstation is switched to the default of VLAN, as described above.

In some embodiments, UBVMS server 144 learns of logons by periodically reading the system log. When UBVMS server 144 detects a new logon record, the server checks if the workstation name in the logon record matches one of the names in the list of stations that are bound to VLANs based on user names. If a match is found, the UBVMS server starts executing the program UBA (Appendix B) right away, without waiting for a request from the client. UBVMS server 144 reads the user name needed by step UBA1-1 and the MAC address needed by step UBA1-2 from the logon record. After step UBA1-2, UBVMS server 144 waits for the client's request. The client sends the request at step CLNA1-1, as described above. Step UBA0 is performed after the request is received, and not before step UBA1 as in Appendix B. After receiving the request, the UBVMS server executes steps UBA2, UBA3, UBA4 as described above. The client executes the programs of Appendix A as described above.

In some embodiments in which the UBVMS server 144 learns of the logon and/or logoff events from the system log, if a client station is turned off or disconnected, switch fabric 130 detects a carrier drop, and notifies the UBVMS server. UBVMS server 144 may switch the client port to the default VLAN, as described above.

In some embodiments, program CLNA (Appendix A) causes the client itself to issue a command to the switch fabric 130 to bind the client to the assigned VLAN or VLANs. When the user logs off, the client issues a command to switch fabric 130 to bind the client to the default VLAN. UBVMS server 144 is omitted. However, in some such embodiments the network security level is lowered because the client is allowed to switch itself between different VLANs.

In FIG. 1, every port 136 is connected to a single client 120. Further, every client 120 has only one NIC 137. In some embodiments, a single port 136 is connected to multiple clients and/or clients having multiple NICs. LOGON server 154 allows different users to be simultaneously logged on to different clients connected to the same port 136 only if all those users are allowed to access the same VLANs. Alternatively, in some embodiments, a station membership in a VLAN is defined by the station's MAC address rather than by the port 136 to which the station is connected. In embodiments using the UBVMS server, at step UBA4 the server issues a command to the switch fabric 130 to bind the client MAC address to a proper VLAN or VLANs. In such embodiments, different users are allowed to be logged on to different clients connected to the same port 136 even if the users are not assigned to the same VLANs. At steps UBA1-2, UBVMS2-1A, and at step UBVMS3-1B described below, resolving the MAC address to the switch/port is omitted. At steps UBA4, UBVMS2-1B, UBVM3-1C, the UBVMS server sends the MAC address to the switch fabric 130.

In some embodiments, UBVMS server 144 performs also the DHCP server functions for all VLANs. DHCP servers 138.3, 138.4 are omitted. When UBVMS server 144 has to switch a client to a different VLAN or VLANs (in response to the client's request or upon detecting a logon event in the system log), UBVMS server 144 terminates the client's DHCP lease, switches the client to the assigned VLAN(s), allocates a new IP for the client in each assigned VLAN, sends the new IP(s) to the client, and then uses the new IP(s) to send the IP mask(s) to the client.

In some embodiments, UBVMS server 144 does not perform the DHCP server functions, but UBVMS server 144 filters all requests to DHCP servers and all responses from the servers. In the embodiments of Appendices A and B, at step UBA3 the UBVMS server simply waits for the client to release the DHCP lease and for the DHCP server to respond to the client.

Figure 2:
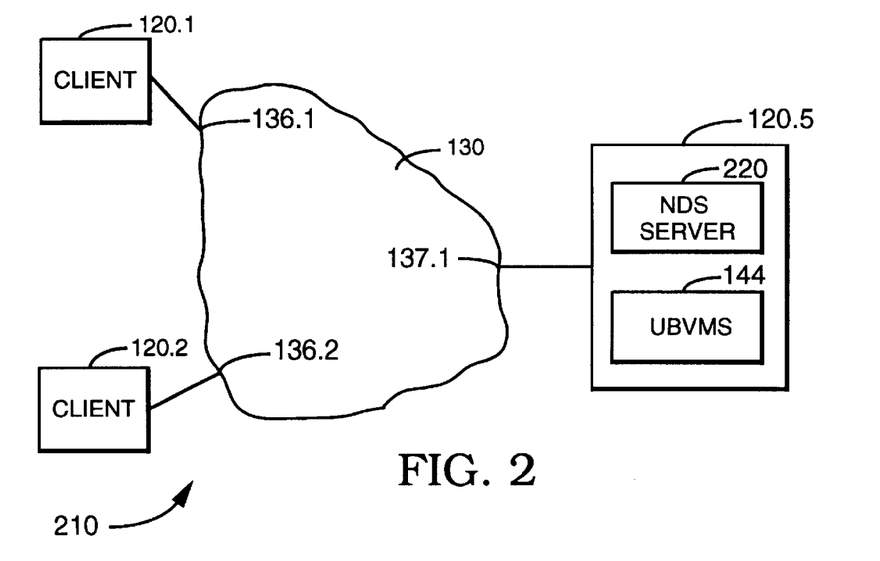

In FIG. 2, the network 210 is of type NetWare®. Such networks are described, for example, in D. Bierer et al., "NetWare® 4 for Professionals" (1993), incorporated herein by reference. Switch fabric 130 is connected to client stations 120.1, 120.2 and server station 120.5. Switches 134 are not shown for simplicity. When switch fabric 130 is powered up, client workstations 120.1, 120.2 are bound to default VLAN V0 (by binding the ports 136.1, 136.2 or the client's MAC addresses, as in embodiments of FIG. 1). Server station 120.5 is connected to trunk port 137.1 directly as shown in FIG. 2, or through a router as in FIG. 1. Stations 120 communicate using the IPX network layer protocol. IPX addresses identify physical stations. A client can recognize its IPX address even if a client is switched to a different VLAN after being assigned the address.

Server station 120.5 runs NDS (NetWare Directory Services) server 220 and UBVMS server 144. As is well known, NDS server 220 is a name server in NetWare networks.

UBVMS server 144 pseudocode is shown in Appendix C. At step UBVMS0, UBVMS server 144 registers itself with NDS server 220 to receive notification of logins and logouts (i.e., logons and logoffs. We use the terms "logon" and "login" interchangeably. We also use the terms "logoff" and "logout" interchangeably.)

Program CLNA is omitted. When a user starts to log in at a client station, for example, station 120.1, UBVMS server 144 is notified of the login. Then UBVMS server 144 searches the list of clients for the workstation name in the login record (step UBVMS3-1). The list is stored on station 120.5. If there is no match, the login processing terminates. Otherwise, UBVMS server 144 reads the user name from the login record and resolves the user name to the assigned VLAN or VLANs (step UBVMS3-1A). The association between user names and assigned VLANs is stored in the NDS database.

UBVMS server 144 reads the workstation name from the login record and resolves the workstation name to the client MAC address and/or the client's switch/port (step UBVMS3-1B, which is similar to step UBA1-2). UBVMS server 144 sends a command to the switch fabric 130 to bind the client's port (e.g., port 136.1 for client 120.1) or the client's MAC address to the VLAN or VLANs assigned to the user (step UBVMS3-1C similar to step UBA4).

When the user logs out, UBVMS server 144 is notified (step UBVMS2). UBVMS server 144 searches the list of clients for the workstation name in the logout record. If a match occurs, the following steps are performed. At step UBVMS2-1A, the UBVMS server resolves the workstation name to the client MAC address and/or the client's switch/port (this step is similar to step UBVMS3-1B). At step UBVMS2-1B, UBVMS server 144 sends a command to the switch fabric 130 to bind the client's port or the client's MAC address to the default VLAN (similar to step UBVMS3-1C).

In some embodiments, a single port 136 of switch fabric 130 is connected to multiple clients and/or to clients having multiple NICs, as described above in connection with FIG. 1.

In some embodiments, switch fabric 130 includes switches of type Catalyst 5000 mentioned above.

In some embodiments of FIG. 1 or 2, the switch fabric 130 is made with switches available from UB Networks, Inc. of Santa Clara, Calif. These switches allow a VLAN to be subdivided into workgroups. Each workgroup is broadcast domain within a VLAN. The switch fabric assigns each port 136 to one or more workgroups. In some embodiments, all the clients 120 are in the same VLAN, but possibly in different workgroups. A default workgroup contains all the clients to which no user has signed on. The operation of the clients and the UBVMS server is similar to that described above in connection with Appendices A and B or C. However, the clients are switched between different workgroups rather than VLANs. Further, since the clients remain in the same VLAN, release of DHCP leases is unnecessary because the clients use the same IP addresses in any workgroup.

Thus, in some embodiments, the client program CLNA sends a request to UBVMS server 144 to switch the client to the workgroup(s) assigned to the user. The request includes the user name and the client MAC address. UBVMS server 144 switches the client to the assigned workgroup(s) if needed, and responds to the client with a message that the client is in the assigned workgroup(s). The client starts a background process waiting for a logoff. When the user logs off, the logoff process requests UBVMS server 144 to switch the client back to the default workgroup. UBVMS server 144 switches the client to the default workgroup.

In some embodiments, the background process periodically checks that the client is in the assigned workgroup(s). If not, the background process requests the UBVMS server to switch the client to the default workgroup, or to workgroup(s) assigned to a different user, similarly to FIG. 1 embodiments described above. In some embodiments, when switch fabric 130 detects a carrier drop on a port to which a client was connected, switch fabric 130 switches the port to the default workgroup, as described above for some embodiments of FIG. 1.

In some embodiments, UBVMS server 144 detects logon and logoff events from a system log, as described above for some embodiments of FIGS. 1 and 2. Program CLNA is omitted. UBVMS server 144 switches a client to workgroup (s) assigned to the user when the user logs on, and switches the client to the default workgroup when the user logs off, similarly to some embodiments described above in connection with FIGS. 1 and 2.

The above embodiments illustrate but do not limit the invention. The invention is not limited to any particular network, computer hardware or software, or the number of client stations or switches. In some embodiments, the program CLNA (Appendix A) and the logon script CLNS are stored on NT server 120.5 to simplify installation and maintenance of the programs CLNA, CLNS and increase the network security. In other embodiments, all or part of the two programs are stored on client workstations. In some embodiments, step CLNA2 is omitted, and no background process is started.

In some embodiments, switches 134 put incoming packets into VLANs determined based on the packets' source IP addresses. If the source IP address is in a particular subnet, switch fabric 130 will put the packet into the VLAN corresponding to the subnet. Thus, the packet will be forwarded only to those ports on which the switch fabric has received a packet with a source IP address in the same subnet. Such switches are available from Agile Networks, Inc. In some such embodiments, the UBVMS server performs also the DHCP server functions. When the UBVMS server receives a client's request to be switched to VLAN(s) assigned to the user, the UBVMS server sends to the client the IP address(es) belonging to the assigned VLAN subnet (s). The switch fabric will put the packets sent by the client into the assigned VLAN(s) if the packets use the IP address (es) in the assigned VLAN subnet(s).

Other embodiments and variations are within the scope of the invention, as defined by the appended claims.

APPENDIX A

Client Pseudocode

CPW - Client Power Up Program (Prior Art):

Send a message to DHCP server to get an IP address. Receive the IP address. Register the IP address and the client workstation name with the WINS server.
CLN - Client Logon program (Prior Art):

CLN1. Send a logon request, containing the user name and password and the workstation name, to the LOGON server.
    LOGON server authenticates the logon, and sends Security ID to client -- see program SCLN (serve client logon) in Appendix B.
CLN2. Execute the logon script.
CLNS - Logon script executed by client:

CLNS1. Load a client logon application (CLNA - see below) from the NT server. Execute the application.
CLNS2. Perform other actions as needed.
CLNA - Client Logon Application invoked from logon script (from CLNS):

CLNA1. Perform the following steps repeatedly until the client's IP is in the assigned VLAN or VLANs:
    CLNA1-1. Send request to the UBVMS server to switch the client to VLAN or VLANs assigned to the user. The request contains the user name, MAC address, and IP address. The UBVMS server response contains an indication of whether switching to another VLAN or VLANS is needed, and the assigned IP subnet(s). If no switching is needed, go to step CLNA2.
    CLNA1-2. Release the DHCP lease.
    CLNA1-3. Wait for a predetermined time to allow the UBVMS server to switch the client to the assigned VLAN or VLANs.
    CLNA1-4. Get a new DHCP lease, and re-register with WINS using the new IP address.
    CLNA1-5. Check if the new IP is in the assigned VLAN or VLANs. If not, go to step CLNA1-1.
CLNA2. Start a client background process that waits for logoff.

APPENDIX B

Server Pseudocode

SCLN - LOGON Server Processing of Client's Logon Request:

The client request includes the user name and password, and client workstation name.
SCLN1. Send the user name and password to the authentication server. If the response from the authentication server shows authentication failure, respond to client with an error message and terminate the request processing.
SCLN2. Resolve the user name to the security ID (SID) -- use Registry.
SCLN3. Send SID to client.
UBA - UBVMS Server processing of request to switch client to user assigned VLAN or VLANs if needed:

The request contains the user name, the client workstation name and the client MAC and IP addresses.
UBA0. Log the request in the system log.
UBA1. Determine (1) the assigned VLAN or VLANs and (2) client MAC address and/or switch/port:
    UBA1-1. Resolve the user name (and possibly the domain name and/or other information) to the user assigned VLAN or VLANs (use Registry).
    UBA1-2. Resolve the client MAC address to the switch/port connected to the client (use the switch fabric discovery service).
UBA2. Send client a response with:
    1) indication of whether client Will be switched to different VLAN(s)
    2) IP subnet (i.e., IP address defining the subnet and IP subnet mask) for each assigned VLAN
If the client will not be switched, terminate the request processing.
UBA3. Wait for client to release the DHCP lease.
UBA4. Switch client to assigned VLAN(s).

APPENDIX C

UBVMS Server Pseudocode

UBVMS0. Register with NDS server to receive notification of logins and logouts.
UBVMS1. Wait for login or logout.
UBVMS2. On logout:
    UBVMS2-1. Search the list of clients for logout workstation name. If found:
        UBVMS2-1A. Resolve the logout workstation name to client MAC address and/or switch/port.
        UBVMS2-1B. Switch the client to the default VLAN.
UBVMS3. On login:
    UBVMS3-1. Search the list of clients for login workstation name. If found:
        UBVMS3-1A. Resolve the login user name to the assigned VLAN or VLANs.
        UBVMS3-1B. Resolve the login workstation name to client MAC address and/or switch/port.
        UBVMS3-1C. Switch the client to the assigned VLAN or VLANs.

We claim:

1. A method for binding a first network station to one or more VBDs, wherein the first network station has one or more ports for connection to a physical network, the method comprising:

the first network station receiving a user identification of a user logging on to the first network station;

the first network station sending to at least one of the one or more ports a request to be bound to one or more VBDs determined based on information comprising the user identification, wherein the request to be bound to the one or more VBDs uses a first logical address as an address of the first network station;

the first network station requesting a release of the first logical address; and the first network station sending a request for a second logical address for communication over the one or more VBDs.

2. The method of claim 1 wherein at least one VBD is a VLAN.

3. The method of claim 1 wherein at least one VBD is a workgroup.

4. The method of claim 1 wherein:

the request for the second logical address is to be served by a second network station in the one or more VBDs; and after the first network station has requested a release of the first logical address but before the first network station sends the request for the second logical address, the first network station waits for a while to be bound to the one or more VBDs.

5. The method of claim 1 wherein said information comprises a name of at least one domain to which the user is logged on.

6. A computer readable medium comprising:
    means for a computer program to receive a user identification of a user logging on to the first network station;
    means for the first network station to send to at least one of its one or more ports a request to be bound to one or more VBDs determined based on information comprising the user identification, wherein the request uses a first logical address as an address of the first network station;
    means for the first network station to request a release of the first logical address; and
    means for the first network station to send a request for a second logical address for communication over the one or more VBDs.

7. The computer readable medium of claim 6 wherein at least one VBD is a VLAN.

8. The computer readable medium of claim 6 wherein at least one VBD is a workgroup.

9. The computer readable medium of claim 6 wherein:
    the request for the second logical address is to be served by a second network station on the one or more VBDs; and
    the medium further comprises means for the first network station to wait after requesting a release of the first logical address but before sending the request for the second logical address.

10. A first network station comprising:
    one or more ports for connection to a physical network;
    means for receiving a user identification of a user logging on to the first network station;
    means for sending to at least one of the one or more ports a request to be bound to one or more VBDs determined based on information comprising the user identification, wherein the request to be bound to the one or more VBDs uses a first logical address as an address of the first network station;
    means for requesting a release of the first logical address; and
    means for sending a request for a second logical address for communication over the one or more VBDs.

11. The first network station of claim 10 wherein at least one VBD is a VLAN.

12. The first network station of claim 10 wherein at least one VBD is a workgroup.

13. The first network station of claim 10 wherein:
    the request for the second logical address is to be served by a second network station in the one or more VBDs; and
    the first network station further comprises means for causing the first network station, after the first network station has requested a release of the first logical address but before the first network station sends the request for the second logical address, to wait for a while to be bound to the one or more VBDs.

14. The first network station of claim 10 wherein said information comprises a name of at least one domain to which the user is logged on.

15. A method for binding network stations to VBDs, the method comprising:
    receiving a request to bind a network station to one or more VBDs;
    determining one or more VBDs to which the network station is to be bound, wherein the one or more VBDs are determined using an identification of a user who logged on to the network station;
    sending a response to the request;
    waiting for the network station to release the network station's logical address used in the request to bind the network station to the one or more VBDs; and
    after waiting for the network station to release the logical address, issuing a command to bind the network station to the one or more VBDs.

16. The method of claim 15 wherein at least one VBD is a VLAN.

17. The method of claim 15 wherein at least one VBD is a workgroup.

18. The method of claim 15 wherein the command is a command to an internetwork system which is to forward communications from the network station.

19. The method of claim 15 further comprising detecting logon events, wherein determining one or more VBDs comprises:
    detecting a logon event that occurred at the network station;
    identifying a user that caused the logon event; and
    using identification of the user to determine the one or more VBDs.

20. A method for binding network stations to VBDs, the method comprising:
    determining one or more VBDs to which a network station is to be bound, wherein the one or more VBDs are determined using an identification of a user who logged on to the network station;
    issuing a command to bind the network station to the one or more VBDs;
    detecting a logoff event at the network station; and
    binding the network station to a predetermined VBD.

21. The method of claim 20 wherein detecting a logoff comprises receiving a request to bind the network station to the predetermined VBD.

22. The method of claim 20 wherein detecting a logoff comprises repeatedly reading a system log to detect logoff events.

23. The method of claim 20 wherein at least one VBD is a VLAN.

24. The method of claim 20 wherein at least one VBD is a workgroup.

25. The method of claim 20 wherein the command is a command to an internetwork system which is to forward communications from the network station.

26. The method of claim 20 further comprising detecting logon events, wherein determining one or more VBDs comprises:
    detecting a logon event that occurred at the network station;
    identifying a user that caused the logon event; and
    using identification of the user to determine the one or more VBDs.

27. A computer readable medium comprising:
    means for receiving a request to bind a network station to one or more VBDs;

means for determining one or more VBDs to which the network station is to be bound, wherein the one or more VBDs are determined using a user identification of a user who logged on to the network station;

means for sending a response to the request;

means for waiting for the network station to release the network station's logical address used in the request to bind the network station to the one or more VBDs; and means for issuing a command to bind the network station to the one or more VBDs, wherein the command is to be issued after waiting for the network station to release the logical address.

28. The computer readable medium of claim 27 wherein at least one VBD is a VLAN.

29. The computer readable medium of claim 27 wherein at least one VBD is a workgroup.

30. The computer readable medium of claim 27 wherein the command is a command to an internetwork system which is to forward communications from the network station.

31. The computer readable medium of claim 27 further comprising means for detecting logon events, wherein the means for determining one or more VBDs comprises:

means for identifying a user and a network station which caused a logon event; and means for using the identification of the user to determine the one or more VBDs.

32. A computer readable medium comprising:

means for determining one or more VBDs to which a network station is to be bound, wherein the one or more VBDs are determined using a user identification of a user who logged on to the network station;

means for issuing a command to bind the network station to the one or more VBDs;

means for detecting a logoff which occurred at a network station; and means for binding the network station at which the logoff occurred to a predetermined VBD.

33. The computer readable medium of claim 32 wherein the means for detecting a logoff comprises means for receiving a request to bind the network station to the predetermined VBD.

34. The computer readable medium of claim 32 wherein the means for detecting a logoff comprise means for repeatedly reading a system log to detect logoff events.

35. The computer readable medium of claim 31 wherein the means for detecting logon events comprises means for registering with a server which is to process logon requests.

36. The computer readable medium of claim 32 wherein at least one VBD is a VLAN.

37. The computer readable medium of claim 32 wherein at least one VBD is a workgroup.

38. The computer readable medium of claim 32 wherein the command is a command to an internetwork system which is to forward communications from the network station.

39. The computer readable medium of claim 32 further comprising means for detecting logon events, wherein the means for determining one or more VBDs comprises:

means for identifying a user and a network station which caused a logon event; and means for using the identification of the user to determine the one or more VBDs.

40. The computer readable medium of claim 39 wherein the means for detecting logon events comprises means for registering with a server which is to process logon requests.

41. A computer system comprising:

means for receiving a request to bind a network station to one or more VBDs;

means for determining one or more VBDs to which the network station is to be bound, wherein the one or more VBDs are determined using a user identification of a user who logged on to the network station;

means for sending a response to the request;

means for waiting for the network station to release the network station's logical address used in the request to bind the network station to the one or more VBDs; and means for issuing a command to bind the network station to the one or more VBDs, wherein the command is to be issued after waiting for the network station to release the logical address.

42. The computer system of claim 41 wherein at least one VBD is a VLAN.

43. The computer system of claim 41 wherein at least one VBD is a workgroup.

44. The computer system of claim 41 wherein the command is a command to an internetwork system which is to forward communications from the network station.

45. The computer system of claim 41 further comprising means for detecting logon events, wherein the means for determining one or more VBDs comprises:

means for identifying a user and a network station which caused a logon event; and means for using the identification of the user to determine the one or more VBDs.

46. A computer system comprising:

means for determining one or more VBDs to which a network station is to be bound, wherein the one or more VBDs are determined using a user identification of a user who logged on to the network station;

means for issuing a command to bind the network station to the one or more VBDs;

means for detecting a logoff which occurred at a network station; and means for binding the network station at which the logoff occurred to a predetermined VBD.

47. The computer system of claim 46 wherein the means for detecting a logoff comprises means for receiving a request to bind the network station to the predetermined VBD.

48. The computer system of claim 46 wherein the means for detecting a logoff comprise means for repeatedly reading a system log to detect logoff events.

49. The computer system of claim 45 wherein the means for detecting logon events comprises means for registering with a server which is to process logon requests.

50. The computer system of claim 46 wherein at least one VBD is a VLAN.

51. The computer system of claim 46 wherein at least one VBD is a workgroup.

52. The computer system of claim 46 wherein the command is a command to an internetwork system which is to forward communications from the network station.

53. The computer system of claim 46 further comprising means for detecting logon events, wherein the means for determining one or more VBDs comprises:

means for identifying a user and a network station which caused a logon event; and means for using the identification of the user to determine the one or more VBDs.

54. The computer system of claim 53 wherein the means for detecting logon events comprises means for registering with a server which is to process logon requests.

* * * * *

UNITED STATES PATENT AND TRADEMARK OFFICE
CERTIFICATE OF CORRECTION

PATENT NO. : 5,968,126
DATED : 10/19/99
INVENTOR(S) : Ekstrom, Joseph J.; Gille, Bernard J.

It is certified that error appears in the above-identified patent and that said Letters Patent is hereby corrected as shown below:

Col. 4, line 65, delete "120" and insert --120.1--.
Col. 6, line 26, delete "UBAL" and insert --UBA1--.
Col. 7, line 48, delete "of" (first occurrence) and insert --a--.
Col. 10, line 63, delete "UBVM3-1C" and insert --UBVMS3-1C--.
Col. 12, line 6, after "is" insert --a--.

Col. 13, lines 29-30 should not be indented. Therefore, lines 29-44 should look as follows:

--

CLNA1. Perform the following steps repeatedly until the client's IP is in the assigned VLAN or VLANs:

CLNA1-1. Send request to the UBVMS server to switch the client to VLAN or VLANs assigned to the user. The request contains the user name, MAC address, and IP address. The UBVMS server response contains an indication of whether switching to another VLAN or VLANs is needed, and the assigned IP subnet(s). If no switching is needed, go to step CLNA2.
    CLNA1-2. Release the DHCP lease.
    CLNA1-3. Wait for a predetermined time to allow the UBVMS server to switch the client to the assigned VLAN or VLANs.
    CLNA1-4. Get a new DHCP lease, and re-register with WINS using the new IP address.
    CLNA1-5. Check if the new IP is in the assigned VLAN or VLANs. If not, go to step CLNA1-1.

CLNA2. Start a client background process that waits for logoff. --

UNITED STATES PATENT AND TRADEMARK OFFICE
CERTIFICATE OF CORRECTION

PATENT NO. : 5,968,126
DATED : 10/19/99
INVENTOR(S) : Ekstrom, Joseph J.; Gille, Bernard J.

It is certified that error appears in the above-identified patent and that said Letters Patent is hereby corrected as shown below:

Col. 14, line 12 (Appendix B), delete "Will" and insert --will--.

Signed and Sealed this

Nineteenth Day of December, 2000

Attest:

Q. TODD DICKINSON

Attesting Officer

Commissioner of Patents and Trademarks